US008485062B2

(12) United States Patent  (10) Patent No.: US 8,485,062 B2
Chiou  (45) Date of Patent: Jul. 16, 2013

(54) DOUBLE-LOCK CABLE AND FLEXIBLE CONDUIT GLAND

(75) Inventor: Jiun Wei Chiou, Taipei County (TW)

(73) Assignee: AVC Industrial Corp., Taipei County (TW)

( * ) Notice: Subject to any disclaimer, the term of this patent is extended or adjusted under 35 U.S.C. 154(b) by 532 days.

(21) Appl. No.: 12/728,053

(22) Filed: Mar. 19, 2010

(65) Prior Publication Data

US 2011/0226083 A1  Sep. 22, 2011

(51) Int. Cl.
*F16C 1/12* (2006.01)

(52) U.S. Cl.
USPC .................................. 74/502.4; 74/502.6

(58) Field of Classification Search
USPC .............. 74/501.6, 502.4, 502.6; 174/653, 174/655; 285/139.3, 143.1, 243, 343, 386, 285/389, 207; 277/602, 616, 619, 622; 439/583–585
IPC ......................................................... F16C 1/12
See application file for complete search history.

(56) References Cited

U.S. PATENT DOCUMENTS

| 2,309,596 | A | * | 1/1943 | Johnson | 285/341 |
| 3,163,432 | A | * | 12/1964 | De Boer | 277/602 |
| 3,466,383 | A | * | 9/1969 | Decker | 174/84 R |
| 3,649,050 | A | * | 3/1972 | Woodling | 285/12 |
| 4,289,818 | A | * | 9/1981 | Casamayor | 428/43 |
| 5,927,892 | A | * | 7/1999 | Teh-Tsung | 403/259 |
| 7,431,343 | B2 | * | 10/2008 | Chiu | 285/151.1 |
| 2006/0219437 | A1 | * | 10/2006 | Chiu | 174/653 |
| 2009/0174154 | A1 | * | 7/2009 | Chiu | 277/603 |

* cited by examiner

*Primary Examiner* — Thomas Diaz
(74) *Attorney, Agent, or Firm* — Chun-Ming Shih

(57) ABSTRACT

A double-lock cable and flexible conduit gland formed of a shell, a collar, a packing ring, and a connection ring is disclosed. The shell has an axial through hole. The collar has an axial through hole. The packing ring has an axial through hole surrounded by a first packing ring segment and a second packing ring segment thereof. The collar is inserted into the axial through hole of the shell. The packing ring is mounted in the axial through hole of the collar. The connection ring and the shell are fastened together by a screw joint, causing the first packing ring segment and second packing ring segment of the packing ring to be wrapped about the inserted cable or the inserted cable and flexible conduit tightly, achieving a double-lock function and protecting against moisture and dust particles.

10 Claims, 16 Drawing Sheets

DOUBLE-LOCK CABLE AND FLEXIBLE CONDUIT GLAND

BACKGROUND OF THE INVENTION

1. Field of the Invention

The present invention relates to a cable and flexible conduit gland and more particularly, to a double-lock cable and flexible conduit gland.

2. Description of the Related Art

In the computer age or information era, people need to receive different information from different source daily. The most simple and quick way to get information is through the TV and the internet. Cable and network signals are transmitted by cables. In an automatic machine, the transmission of a reciprocating action control signal is performed through a cable that has one end connected to a signal receiver or signal source and the other end connected to a signal output device. The connection between the cable and the signal receiver or signal source is achieved by means of a connector or gland.

However, the cable may be disconnected or loosened from the connector or gland when stretched accidentally by an external force, causing leakage. To avoid this problem, an improved design of cable gland is disclosed. This prior art design of cable gland comprises a first shell, a packing ring, a sealing nut, a lock nut, a connection ring, an inner retaining ring, an elastic ring and a second shell. After installation, the packing ring is forced to wrap about the cable tightly, thereby locking the cable and protecting against moisture.

The aforesaid prior art cable gland simply provides one single-layer locking function. The clamping force is applied through the packing ring to the cable at a single point around the periphery of the cable. This clamping force is insufficient to lock the cable. When the cable is stretched accidentally by an external force, it may be disconnected from the signal receiver or signal source. Further, the clamping force of the packing ring is insufficient to protect the signal receiver or signal source against outside moisture.

Therefore, it is desirable to provide a cable and flexible conduit gland, which eliminates the aforesaid problems.

SUMMARY OF THE INVENTION

The present invention has been accomplished under the circumstances in view. It is therefore the main object of the present invention to provide a double-lock cable and flexible conduit gland for securing a cable, or, a cable and a flexible conduit, which has a simple structure formed of a less number of component parts and, which is easy to install and effectively locks the installed cable and flexible conduit to protect against moisture and dust.

To achieve this and other objects of the present invention, a double-lock cable and flexible conduit gland comprises a shell, a collar, a packing ring, and a connection ring. The shell has an axial through hole surrounded by the inside wall thereof, a tapered inner surface formed on the inside wall, and an inner thread formed on the inside wall of the shell. The collar is inserted in the shell, having an axial through hole, a beveled outer end edge suspending outside the axial through hole and stoppable against the tapered inner surface of the shell and a protruding inner stop portion suspending inside the axial through hole. The packing ring is inserted through the axial through hole of the collar and compressible by the collar to hold down the inserted cable or the insertable flexible conduit and cable. The packing ring has a first packing ring segment, a second packing ring segment axially formed integral with one end of the first packing ring segment and an axial through hole surrounded by the first packing ring segment and the second packing ring segment for the insertion of a cable, or a flexible conduit and a cable in the flexible conduit. The second packing ring segment defines a tapered outer surface. The first packing ring segment has an outside annular groove extending around the periphery thereof for receiving the protruding inner stop portions of the collar. The connection ring is sleeved onto the collar and the packing ring and connectable between the shell and the box member. The connection ring has a tapered inner surface formed on the inside wall thereof and stopped against the tapered outer surface of the packing ring, and a first outer thread extending around the periphery thereof and threaded into the inner thread of the shell.

Further, the second packing ring segment of the packing ring reduces gradually in diameter from the first packing ring segment toward the free end thereof.

Further, the collar comprises a plurality of pawls spaced around the axial through hole thereof. The beveled outer end edge of the collar is formed on an outer end of each of the pawls. The protruding inner stop portion of the collar is formed on an inner side of each of the pawls.

Further, the packing ring is prepared from an elastically deformable material.

Further, the connecting ring defines a first connection ring segment, a second connection ring segment and a stop flange segment connected between the first connection ring segment and the second connection ring segment. The stop flange segment has an outer diameter greater than the first connection ring segment and the second connection ring segment. The first connection ring segment carries the first outer thread of the connection ring on the periphery thereof. The connection ring further comprises a second outer thread extending around the periphery of the second connection ring segment for fastening to a hole on the box member.

The double-lock cable and flexible conduit gland further comprises a gasket ring mounted on the second connection ring segment of the connection ring and stopped at one side of the stop flange segment.

Further, the gasket ring has a plurality of raised portions protruded from one side thereof for stopping against the stop flange segment of the connection ring, and a convex portion protruded from an opposite side thereof for stopping against the box member upon fixation of the second connection ring segment to the box member.

In an alternate form of the present invention, the gasket ring has a plurality of raised portions protruded from one side thereof for stopping against the box member upon fixation of the second connection ring segment to the box member, and a convex portion protruded from an opposite the thereof and stopped against the stop flange segment of the connection ring. Further, the stop flange segment of the connection ring has a recessed portion matching the convex portion of sad gasket ring.

Further, the packing ring has at least one dent located on the periphery of the second packing ring segment.

In another alternate form of the present invention, the packing ring has a hooked portion inwardly protruded from and extending along an inside wall thereof for engaging into a groove the inserted flexible conduit.

DETAILED DESCRIPTION OF THE PREFERRED EMBODIMENT

Figure 1:
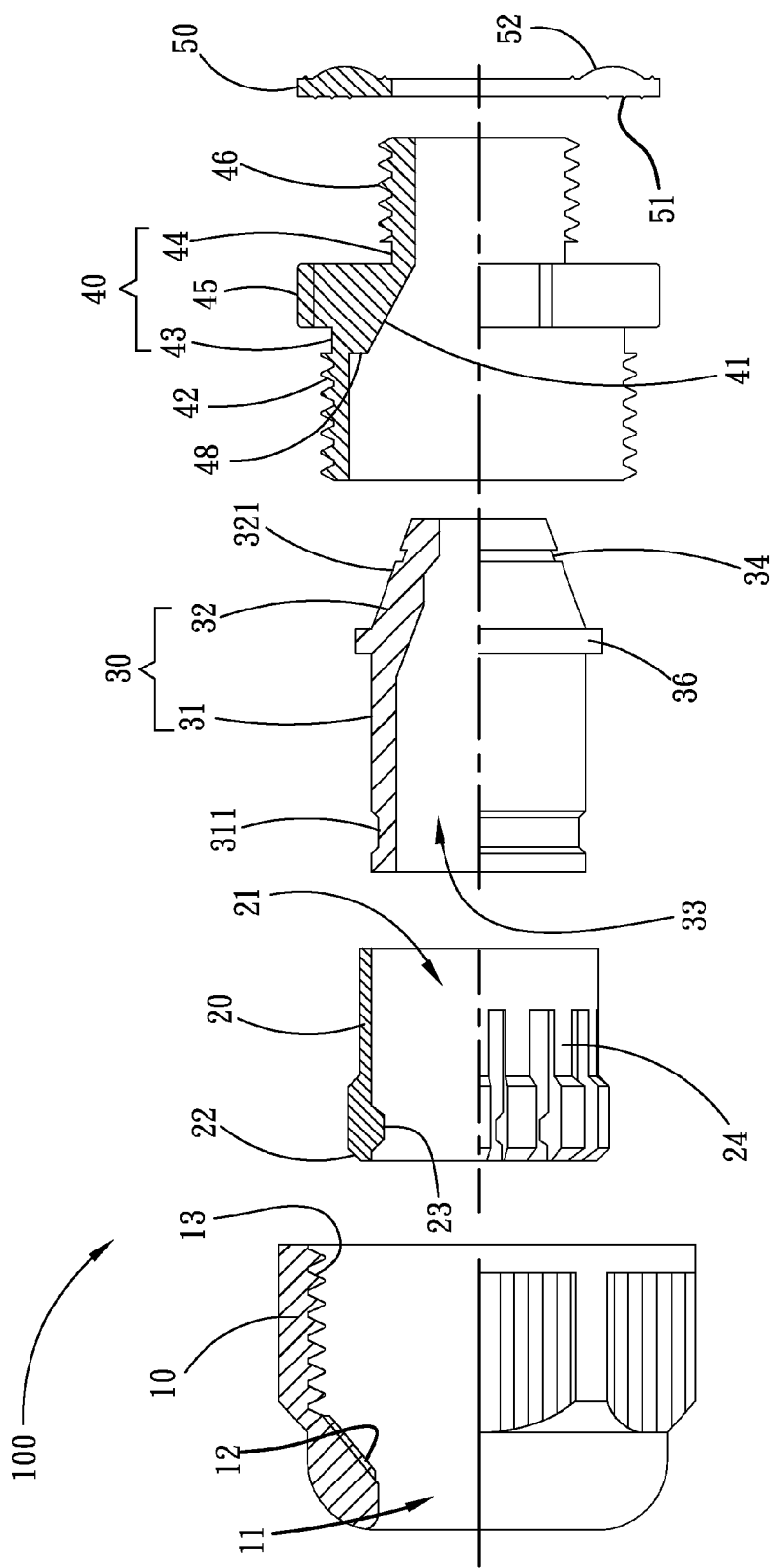
FIG. 1 is an exploded view in section of a double-lock cable and flexible conduit gland in accordance with a first embodiment of the present invention.

Referring to FIGS. 1~8, a double-lock cable and flexible conduit gland 100 in accordance with the present invention is shown comprising a shell 10, a collar 20, a packing ring 30 and a connection ring 40.

Referring to FIGS. 1 and 2 again, the shell 10 has an axial through hole 11, a tapered inner surface 12 formed on the inside wall of the axial through hole 11 and an inner thread 13 formed on the inside wall of the axial through hole 11.

Referring to FIGS. 1 and 2 again, the collar 20 is a tubular member having an axial through hole 21 and a plurality of pawls 24 spaced around the axial through hole 21. Each pawl 24 has a beveled outer end edge 22 suspending outside the axial through hole 21 and a protruding inner stop portion 23 suspending inside the axial through hole 21.

Referring to FIGS. 1 and 2 again, the packing ring 30 is prepared from an elastically deformable material, for example, rubber, having a first packing ring segment 31, a second packing ring segment 32 axially formed integral with one end of the first packing ring segment 31, a stop flange segment 36 connected between said first packing ring segment 31 and said second packing ring segment 32, and an axial through hole 33 surrounded by the first packing ring segment 31 and the second packing ring segment 32. The second packing ring segment 32 is shaped like a tapered tube gradually reducing in diameter from the first packing ring segment 31 toward the free end thereof, defining a tapered outer surface 321. The first packing ring segment 31 has an outside annular groove 311 extending around the periphery thereof. The axial through hole 33 of the packing ring 30 has a diameter at the first packing ring segment 31 larger than that at the second packing ring segment 32.

Referring to FIGS. 1 and 2 again, the connection ring 40 is a tubular member having a retaining surface 48 and a tapered inner surface 41 formed on the inside wall thereof and stopped against the stop flange segment 36 of the packing ring 30 and the tapered outer surface of said packing ring, respectively, and an outer thread 42 extending around the periphery thereof.

After understanding of the structural details of the double-lock cable and flexible conduit gland 100, the assembly process of the double-lock cable and flexible conduit gland 100 is quite simple and described thereinafter.

Figure 2:
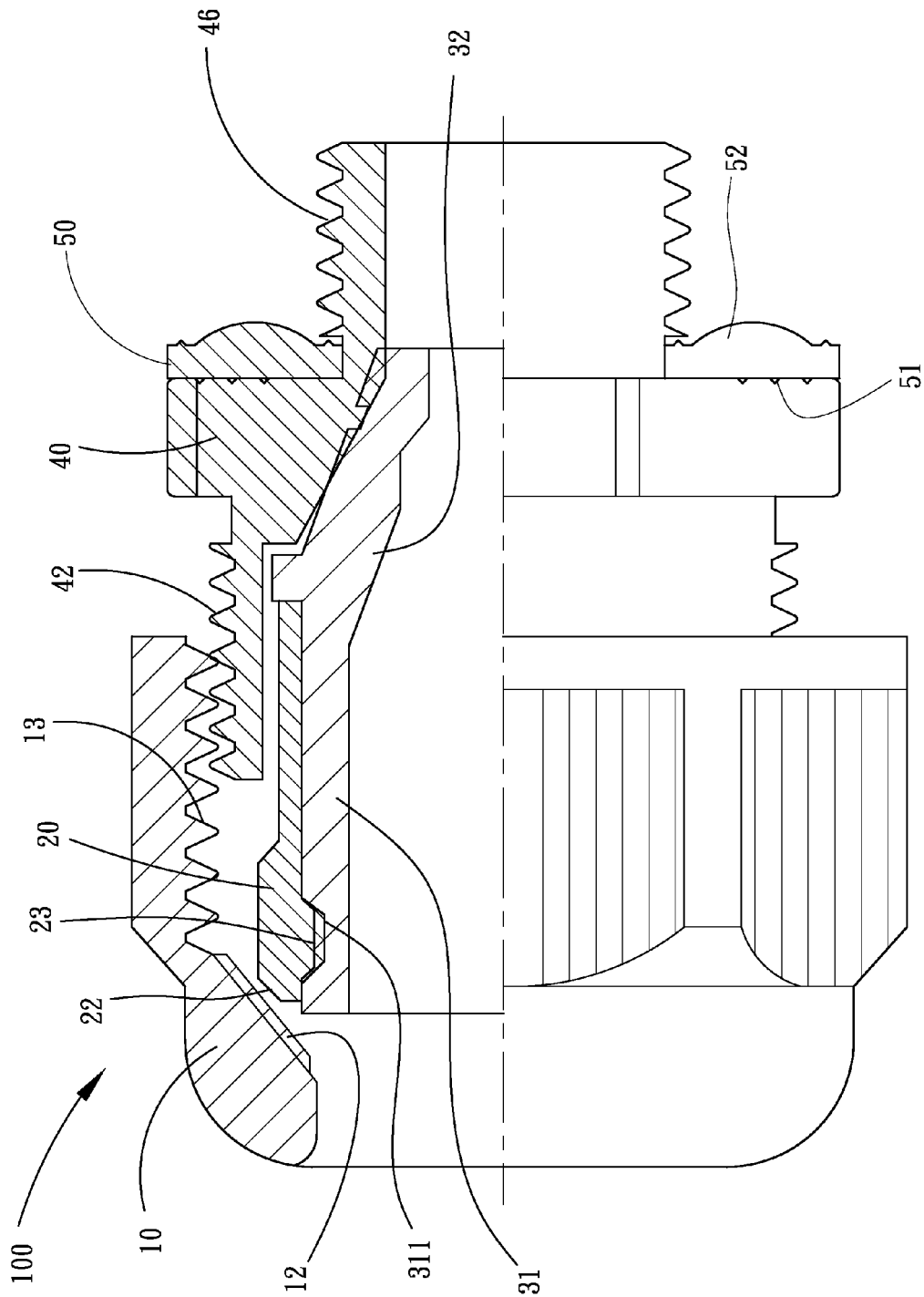
FIG. 2 is a sectional assembly view, in an enlarged scale, of the double-lock cable and flexible conduit gland shown in FIG. 1.

At first, as shown in FIG. 2, insert the first packing ring segment 31 of the packing ring 30 into the axial through hole 21 of the collar 20 to force the outside annular groove 311 of the first packing ring segment 31 into engagement with the protruding inner stop portion 23 of the collar 20, and then insert the second packing ring segment 32 of the packing ring 30 into the inside of the connection ring 40, and than thread the outer thread 42 of the connection ring 40 into the inner thread 13 of the shell 10 to abut the tapered inner surface 41 of the connection ring 40 against the tapered outer surface 321 of the packing ring 30 and to aim the beveled outer end edges 22 of the pawls 24 of the collar 20 at the tapered inner surface 12 of the shell 10.

Figure 3:
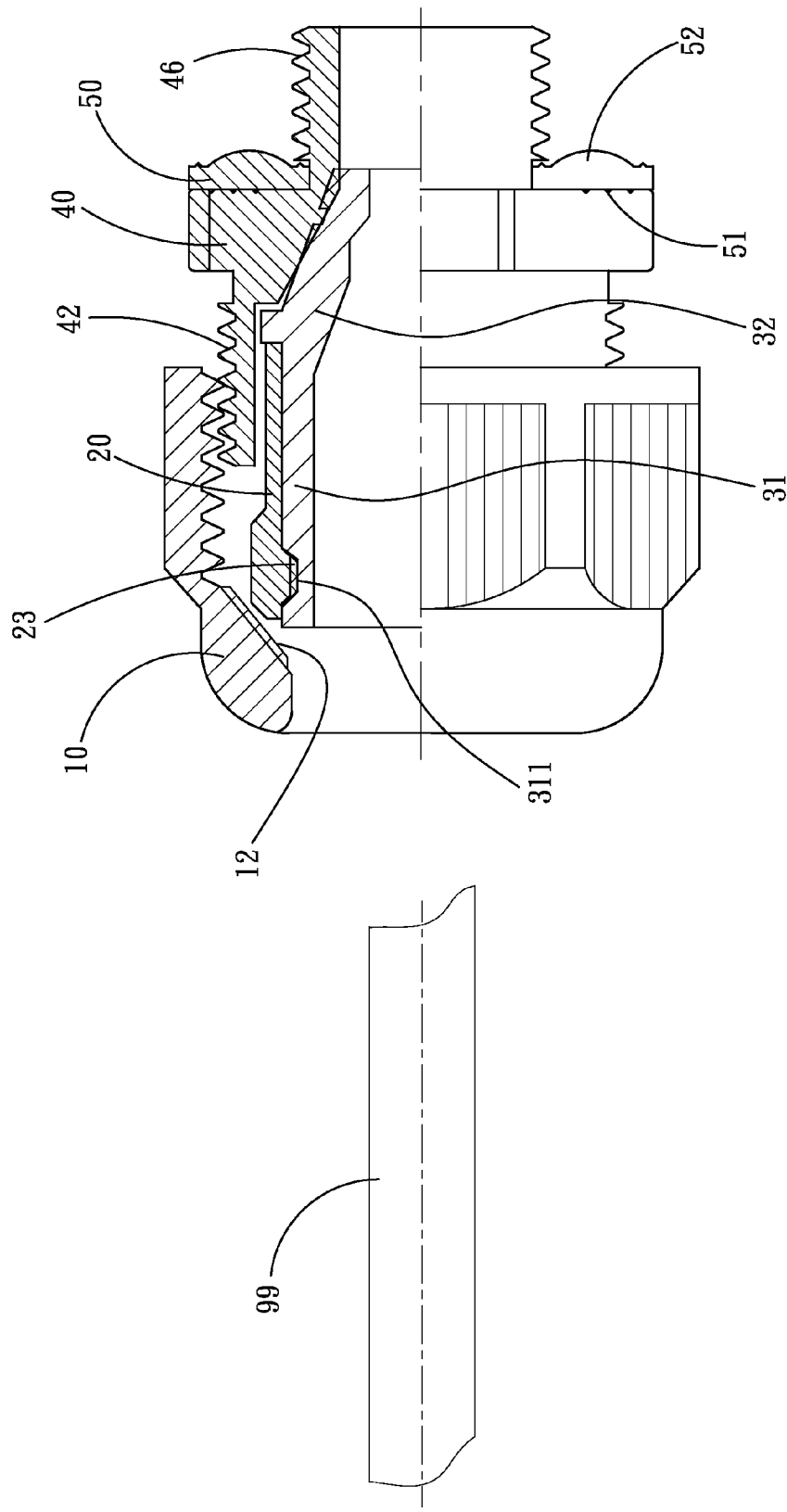
FIG. 3 is a schematic sectional view of the present invention, showing the double-lock cable and flexible conduit gland of FIG. 1 used with a small diameter cable (I).
Figure 4:
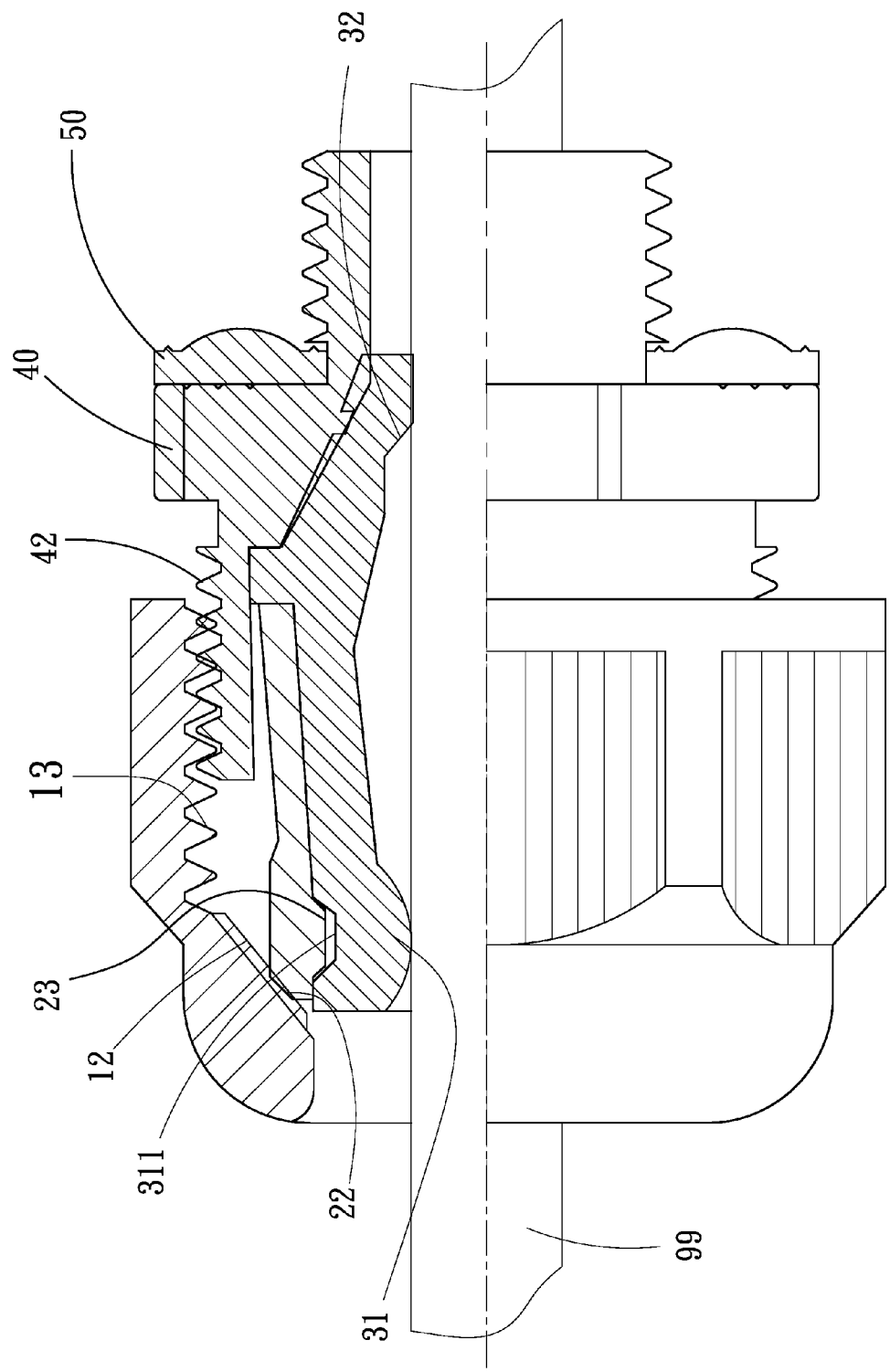
FIG. 4 is a schematic sectional view of the present invention, showing the double-lock cable and flexible conduit gland of FIG. 1 used with a small diameter cable (II).

When using the double-lock cable and flexible conduit gland 100 with a cable 99 having a small outer diameter, as shown in FIGS. 3 and 4, insert the cable 99 into the axial through hole 11 of the shell 10 and then the axial through hole 33 of the collar 30, and then fasten tight the shell 10 (rotating the shell 10 tightly onto the connection ring 40) to force the tapered inner surface 12 of the shell 10 against the beveled outer end edges 22 of the pawls 24 of the collar 20, thereby compressing and deforming the first packing ring segment 31 of the packing ring 30. At this time, the inside wall of the first packing ring segment 31 of the packing ring 30 corresponding to the outside annular groove 311 is forced into engagement with the outside wall of the cable 99, forming a first packing area. At the same time, the tapered outer surface 321 of the second packing ring segment 32 of the packing ring 30 is forced by the tapered inner surface 41 of the connection ring 40 against the outside wall of the cable 99, forming a second packing area. Thus, the aforesaid first packing area and second packing area achieve the expected double-lock function, prohibiting displacement of the cable 99 relative to the double-lock cable and flexible conduit gland 100.

As stated above, the first packing ring segment 31 and second packing ring segment 32 of the packing ring 30 are forced against the outside wall of the cable 99 to achieve the expected double-lock function, the cable 99 will not be disconnected from the double-lock cable and flexible conduit gland 100 accidentally by an external stretching force.

Further, because the double-lock cable and flexible conduit gland 100 is simply composed a limited number of component parts, the assembly and installation of the double-lock cable and flexible conduit gland 100 are easy.

Further, the aforesaid connection ring 40 defines a first connection ring segment 43, a second connection ring segment 44 and a stop flange segment 45 connected between the first connection ring segment 43 and the second connection ring segment 44. The stop flange segment 45 has an outer diameter greater than the first connection ring segment 43 and the second connection ring segment 44. The aforesaid outer thread 42 is located on the periphery of the first connection ring segment 43 for meshing the inner thread 13 of the shell 10. The second connection ring segment 43 has an outer thread 46 extending around the periphery thereof for fastening to a hole on an external panel or box member (not shown).

The double-lock cable and flexible conduit gland 100 according to this first embodiment further comprises a gasket ring 50. As shown in FIGS. 1 and 2, the gasket ring 50 is prepared from an elastically deformable material, for example, rubber. Further, the gasket ring 50 is sleeved onto the second connection ring segment 44 of the connection ring 40 and stopped between the stop flange segment 45 of the connection ring 40 and the panel or box member upon fixation of the second connection ring segment 44 to the panel or box member, thereby sealing the gap and prohibiting access of moisture to the inside of the box member. Subject to the double-lock function of the packing ring 30 worked on the outside wall of the cable 99 and the seal effect of the gasket ring 50, the invention effectively seal the gap to protect against moisture.

Further, the gasket ring 50 has a convex portion 52 protruded from one side for stopping against the panel or box member upon fixation of the second connection ring segment 44 to the panel or box member, enhancing the sealing effect.

Figure 5:
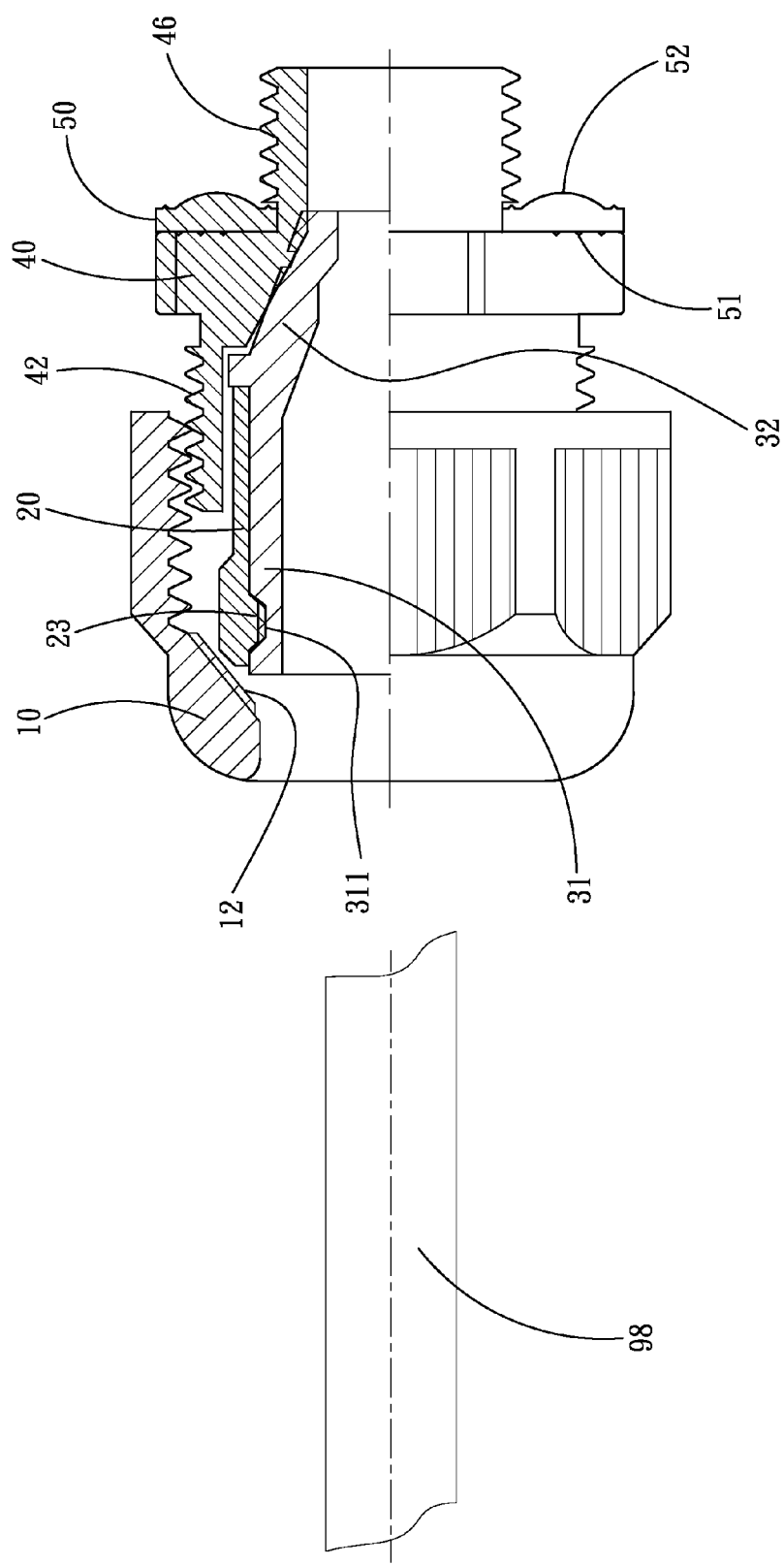
FIG. 5 is a schematic sectional view of the present invention, showing the double-lock cable and flexible conduit gland of FIG. 1 used with a big diameter cable (I).
Figure 6:
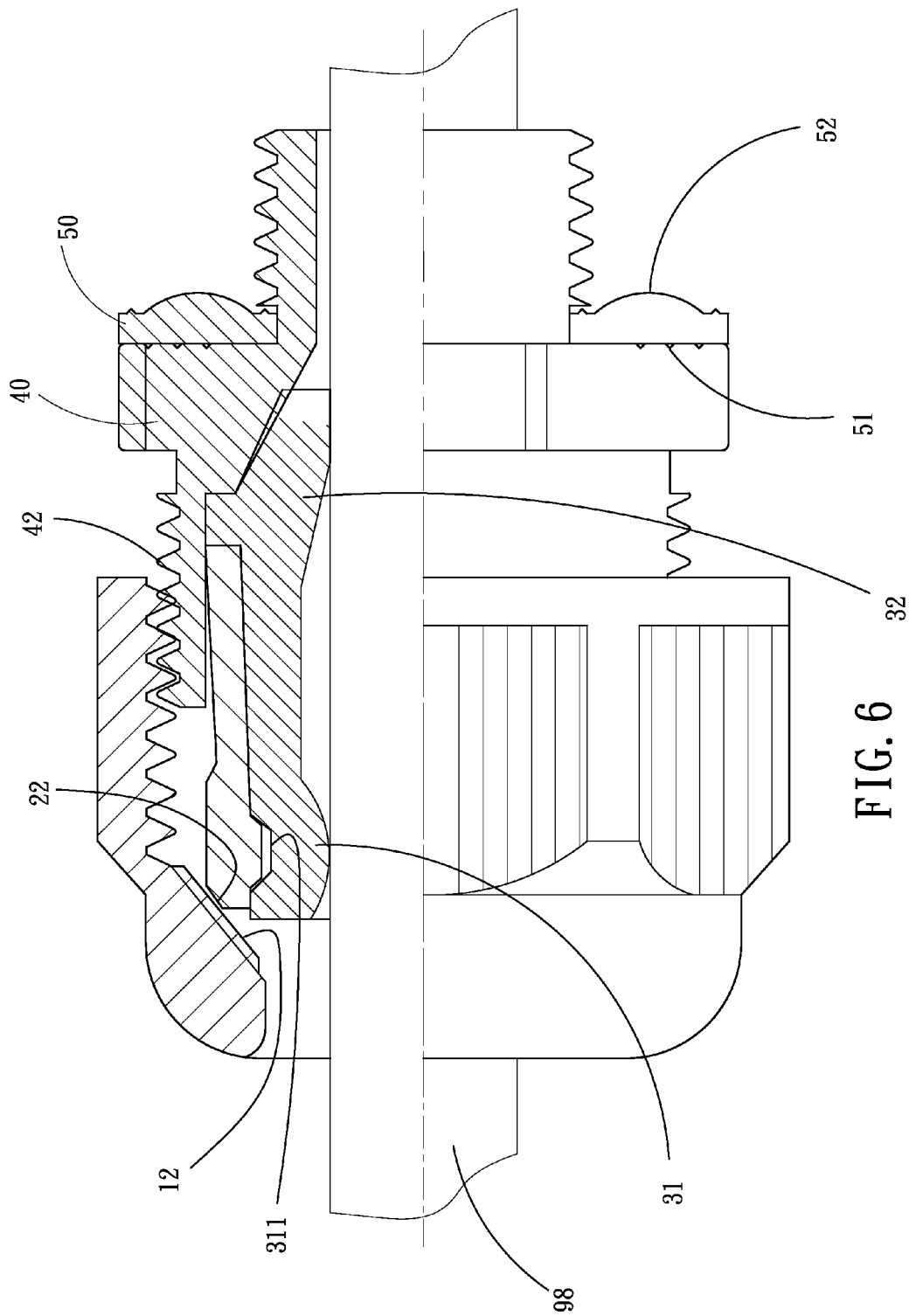
FIG. 6 is a schematic sectional view of the present invention, showing the double-lock cable and flexible conduit gland of FIG. 1 used with a big diameter cable (II).
Figure 7:
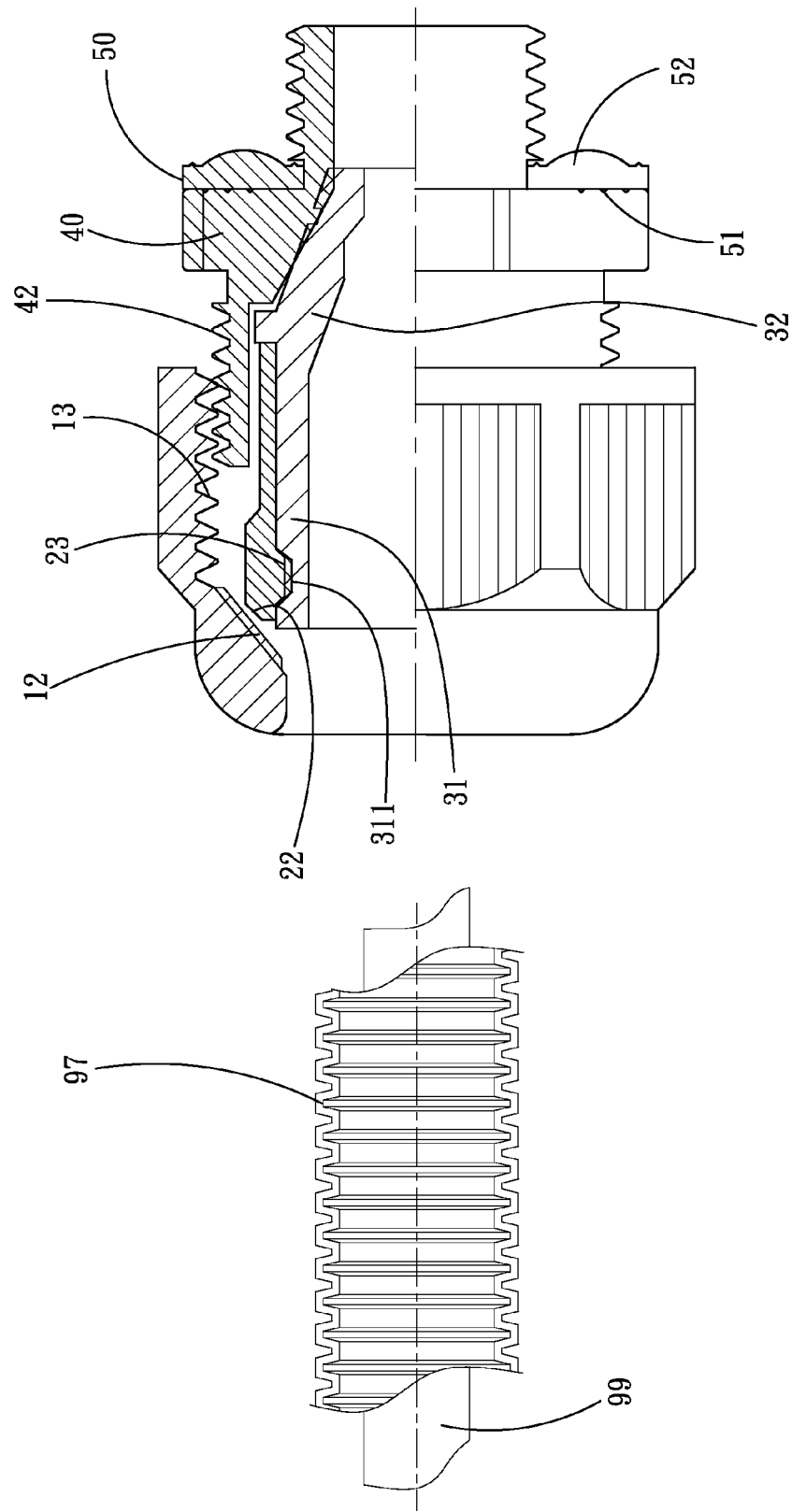
FIG. 7 is a schematic sectional view of the present invention, showing the double-lock cable and flexible conduit gland of FIG. 1 used with a small diameter cable and a flexible conduit (I).
Figure 8:
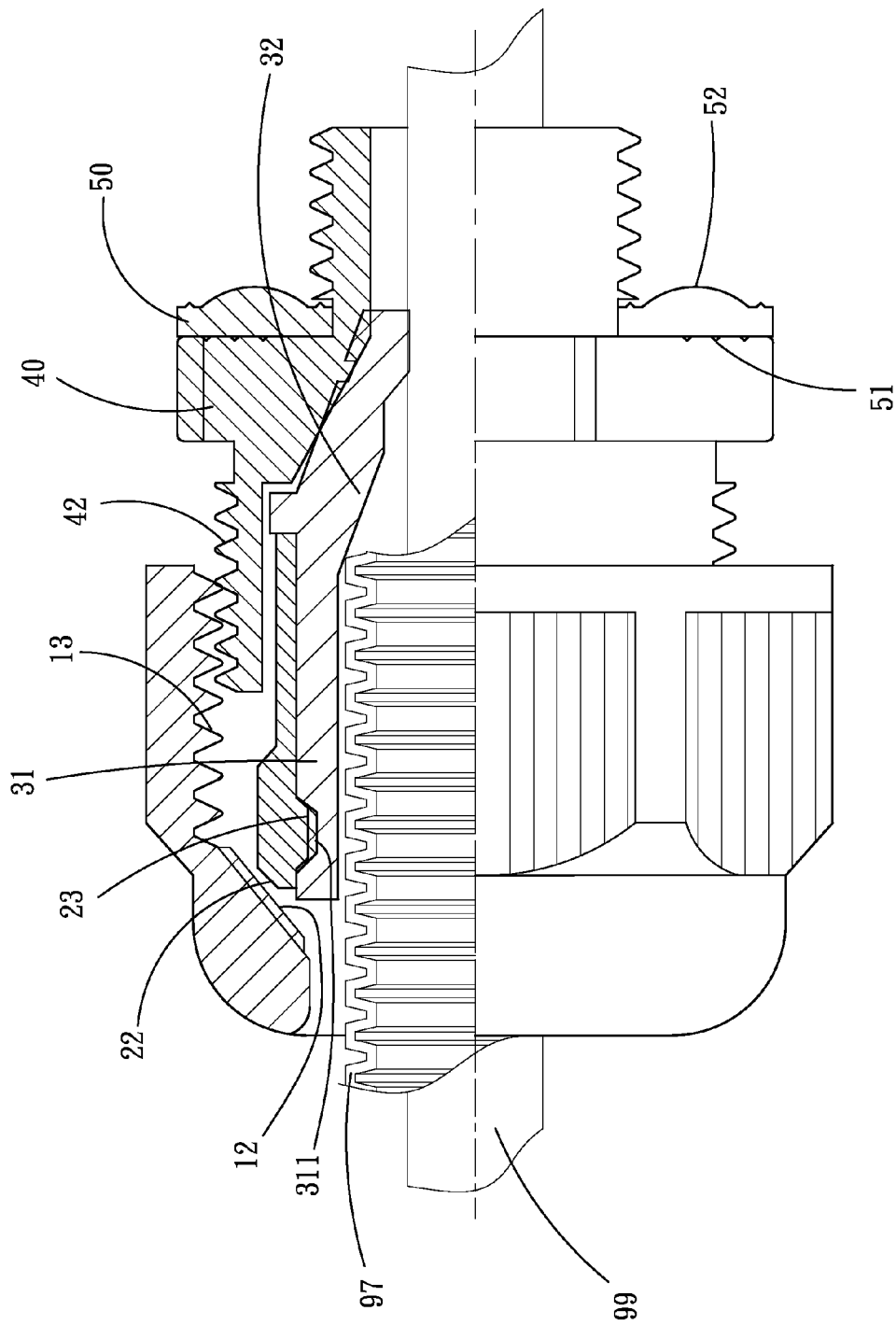
FIG. 8 is a schematic sectional view of the present invention, showing the double-lock cable and flexible conduit gland of FIG. 1 used with a small diameter cable and a flexible conduit (II).

The aforesaid packing ring 30 further has at least one dent 34 located on the periphery of the second packing ring segment 32. When double-lock cable and flexible conduit gland 100 is used with a cable 98 having a big outer diameter, as shown in FIGS. 5 and 6, an end part of the second packing ring segment 32 can be cut off along one of the at least one dent 34, facilitating fixation between the double-lock cable and flexible conduit gland 100 and the cable 98. However, the cut-off length can be determined subject to the diameter of the cable to be installed.

When using the double-lock cable and flexible conduit gland 100 with a small diameter cable 99 being sleeved with a flexible conduit 97, one end of the cable 99 is inserted into the axial through hole 33 of the packing ring 3 of the double-lock cable and flexible conduit gland 100 to let the exposed part of the cable 99 (the part of the cable 99 that is not surrounded by the flexible conduit 97) be positioned in the second packing ring segment 32 and the flexible conduit 97 be positioned in the first packing ring segment 31. When the first packing ring segment 31 and the second packing ring segment 32 are compressed radially inwards, the first packing ring segment 31 is forced to wrap about the flexible conduit 97 tightly, and the second packing ring segment 32 is forced to wrap about the cable 99 tightly, achieving the same double-lock function.

The aforesaid flexible conduit 97 can be a coiled or bellows conduit prepared from metal, plastics or rubber.

Figure 9:
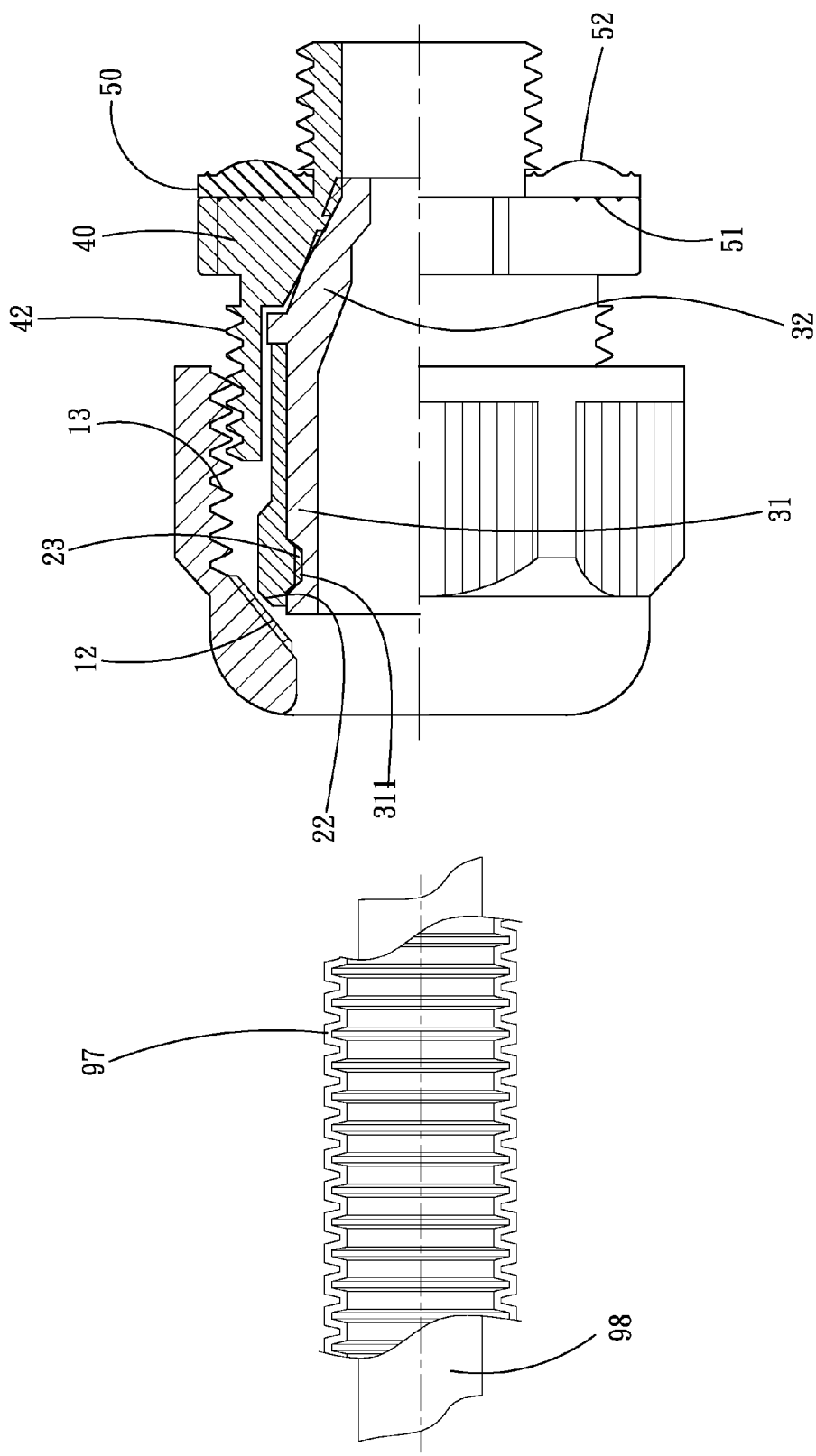
FIG. 9 is a schematic sectional view of the present invention, showing the double-lock cable and flexible conduit gland of FIG. 1 used with a big diameter cable and a flexible conduit (I).
Figure 10:
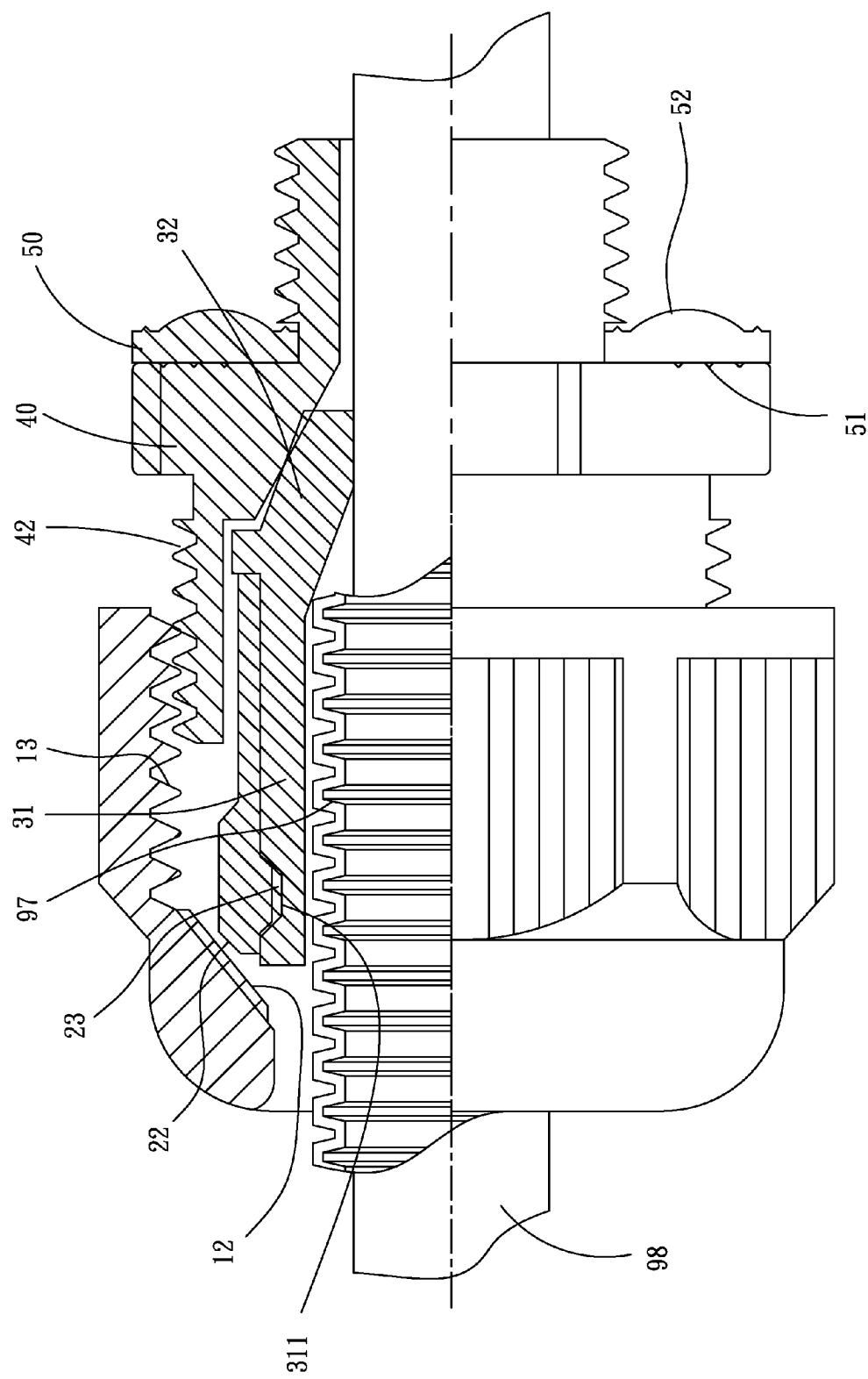
FIG. 10 is a schematic sectional view of the present invention, showing the double-lock cable and flexible conduit gland of FIG. 1 used with a big diameter cable and a flexible conduit (II).

When using the double-lock cable and flexible conduit gland 100 with a big diameter cable 98 being sleeved with a flexible conduit 97, as shown in FIGS. 9 and 10, one end of the cable 98 is inserted into the axial through hole 33 of the packing ring 3 of the double-lock cable and flexible conduit gland 100 to let the exposed part of the cable 98 (the part of the cable 98 that is not surrounded by the flexible conduit 97) be positioned in the second packing ring segment 32 and the flexible conduit 97 be positioned in the first packing ring segment 31, and the end part of the second packing ring segment 32 is cut off properly subject to the outer diameter of the cable 98. When the first packing ring segment 31 and the second packing ring segment 32 are compressed radially inwards, the first packing ring segment 31 is forced to wrap about the flexible conduit 97 tightly, and the second packing ring segment 32 is forced to wrap about the cable 98 tightly, achieving the same double-lock function.

Figure 11:
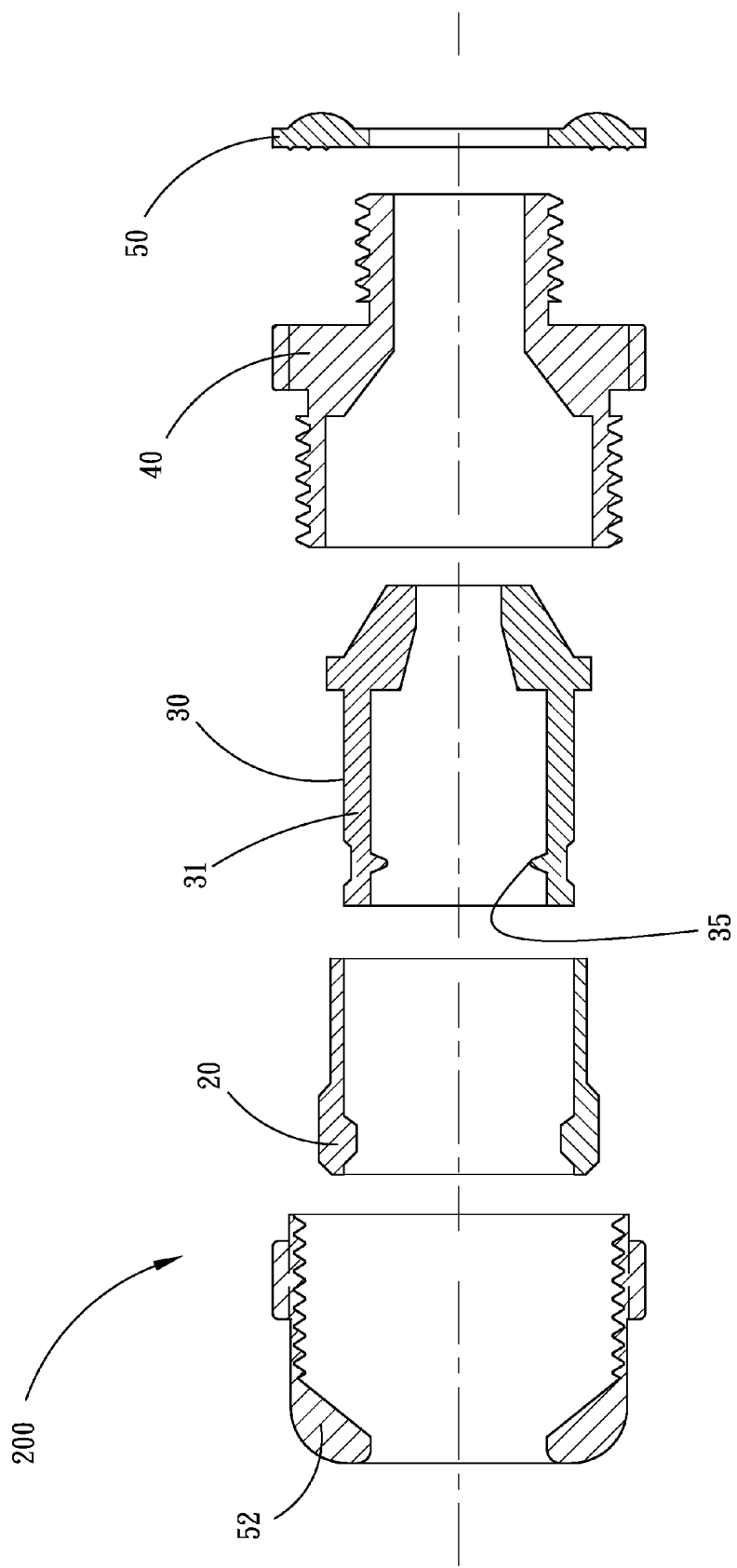
FIG. 11 is an exploded view in section of a double-lock cable and flexible conduit gland in accordance with a second embodiment of the present invention.
Figure 12:
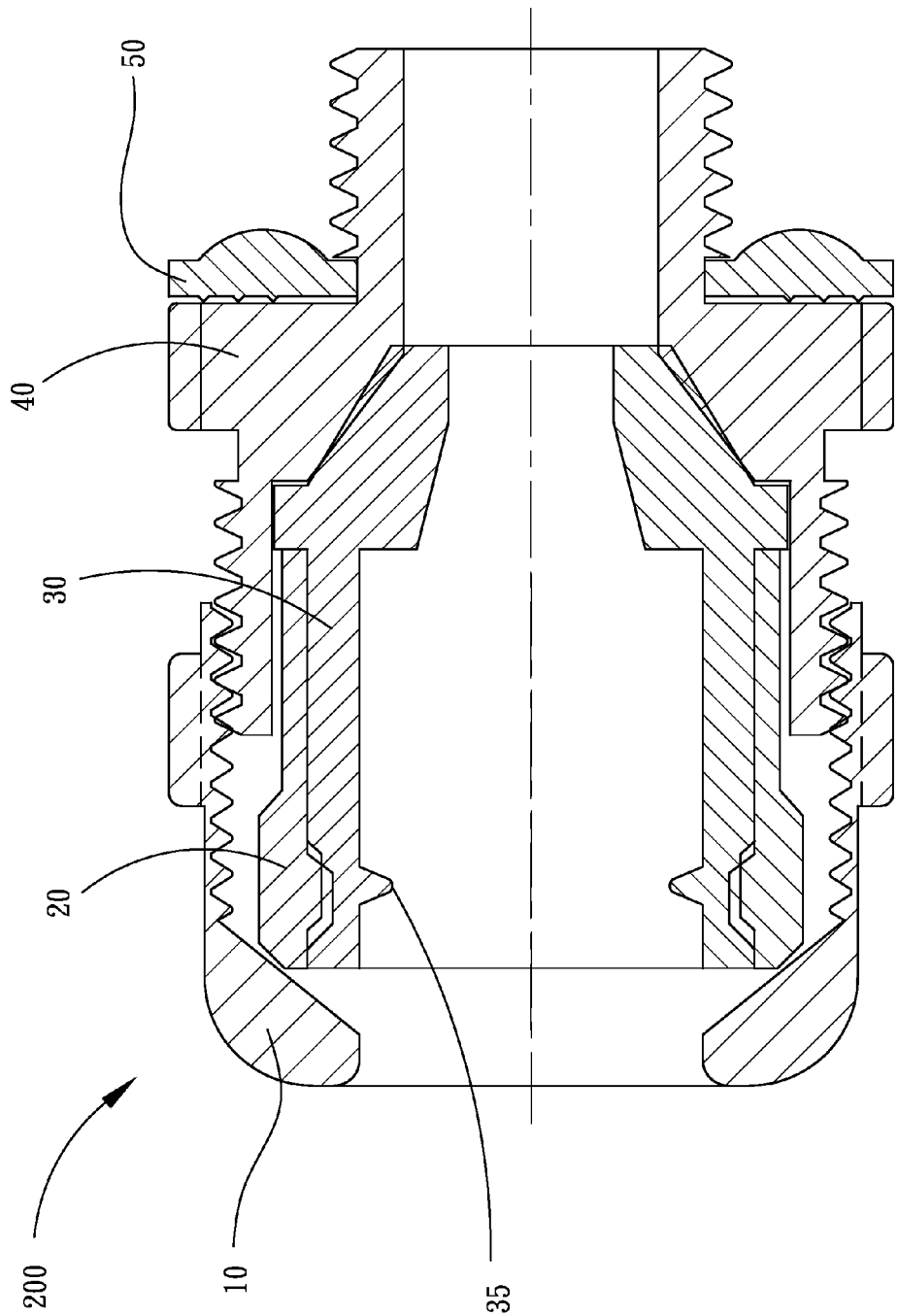
FIG. 12 is a sectional assembly view, in an enlarged scale, of the double-lock cable and flexible conduit gland shown in FIG. 11.
Figure 13:
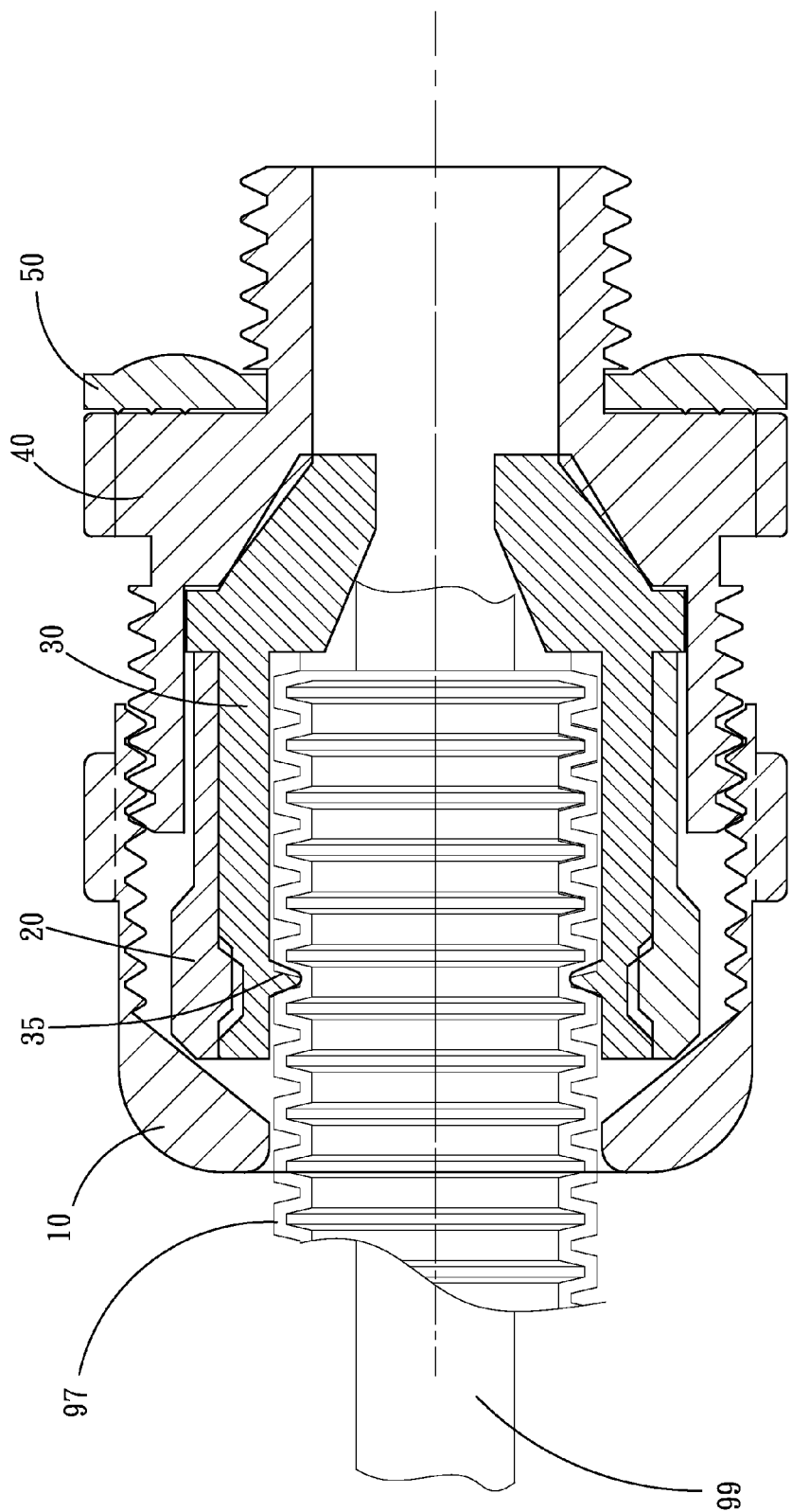
FIG. 13 is a schematic sectional view of the present invention, showing the double-lock cable and flexible conduit gland of FIG. 11 used with a cable and a flexible conduit.

FIGS. 11~13 illustrate a double-lock cable and flexible conduit gland 200 in accordance with a second embodiment of the present invention. According to this second embodiment, the double-lock cable and flexible conduit gland 200 comprises a shell 10, a collar 20, a packing ring 30, a connection ring 40 and a gasket ring 50. This second embodiment is substantially similar to the aforesaid first embodiment with the exception that the packing ring 30 of this second embodiment further has a hooked portion 35 inwardly protruded from and extending along the inside wall thereof. After insertion of the cable 99 with the flexible conduit 97 into the packing ring 30, the hooked portion 35 is forced into engagement with a groove around the periphery of the flexible conduit 97, and thus the flexible conduit 97 is locked to the double-lock cable and flexible conduit gland 200.

Figure 14:
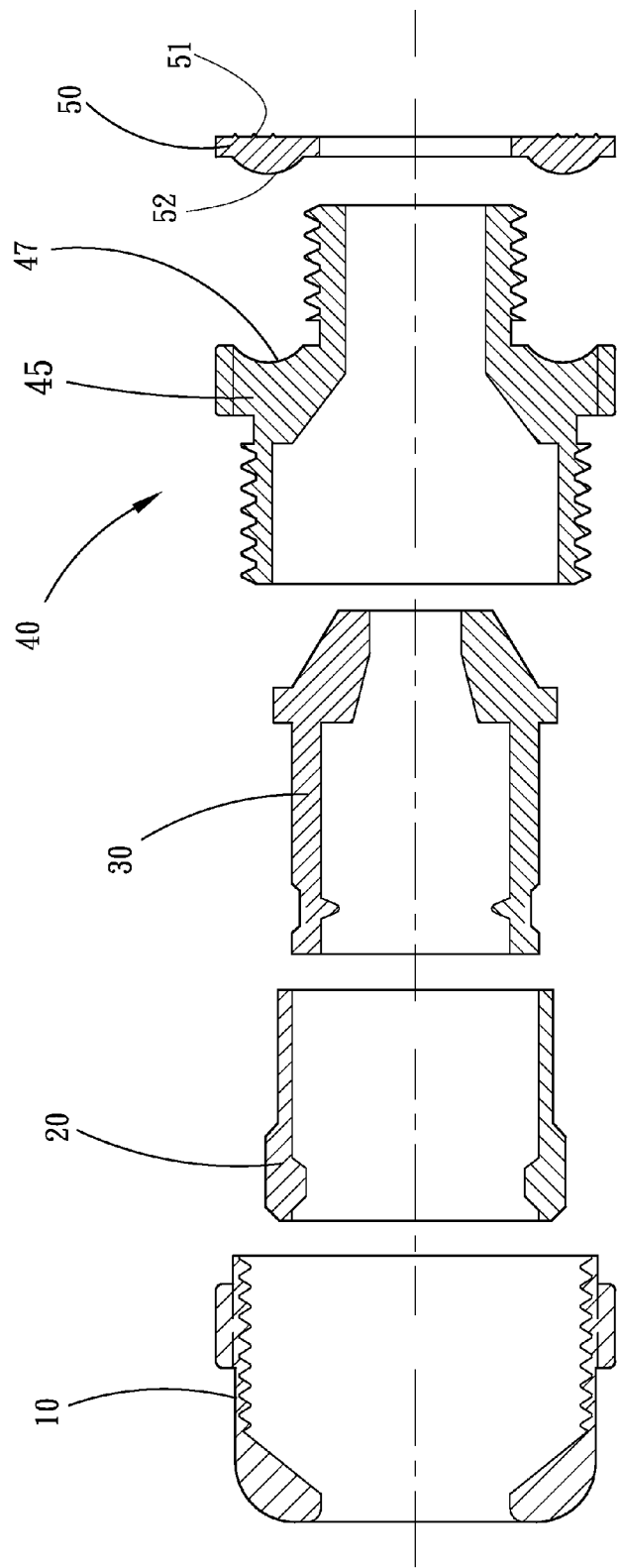
FIG. 14 is an exploded view in section of a double-lock cable and flexible conduit gland in accordance with a third embodiment of the present invention.
Figure 15:
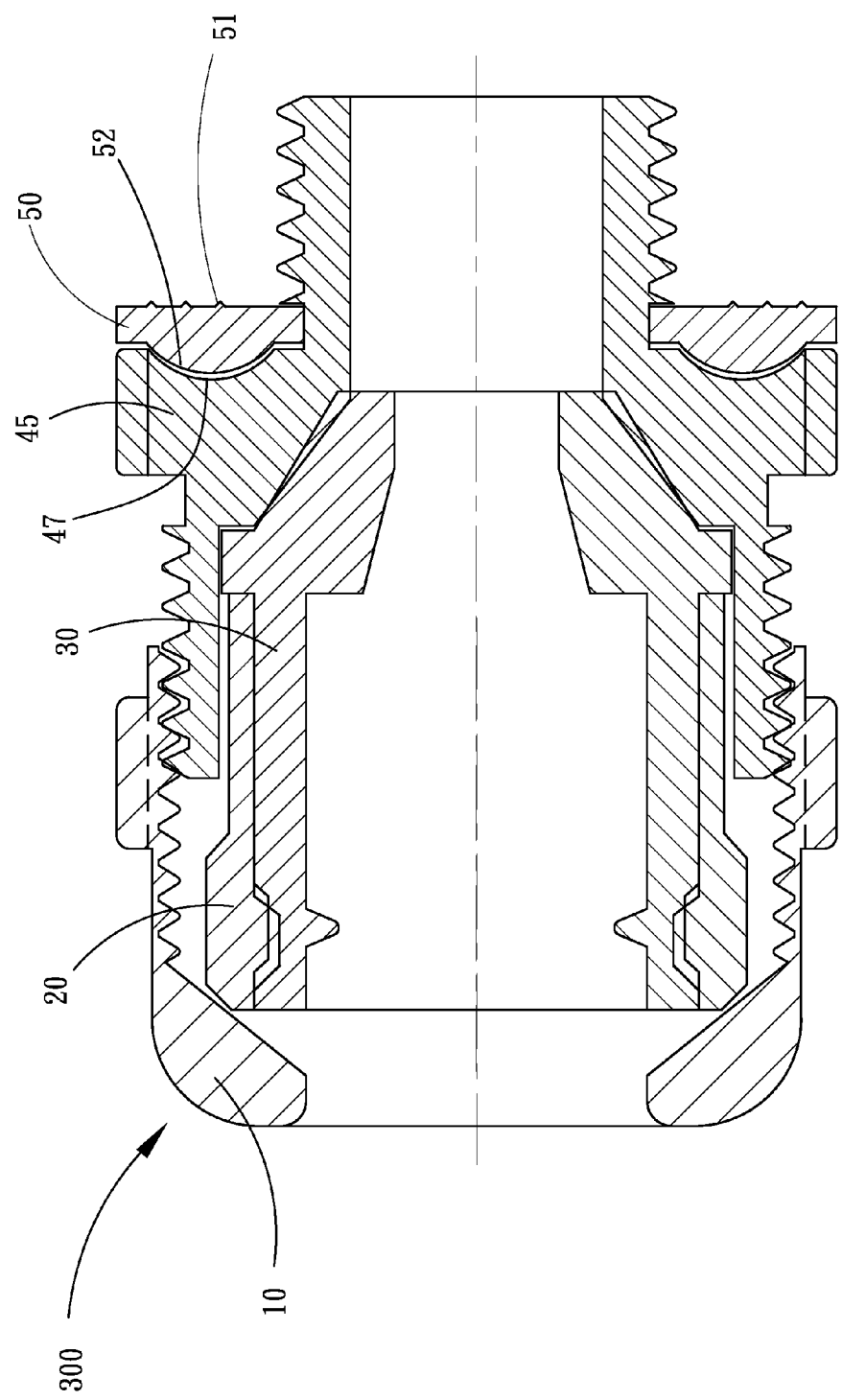
FIG. 15 is a sectional assembly view, in an enlarged scale, of the double-lock cable and flexible conduit gland shown in FIG. 14.
Figure 16:
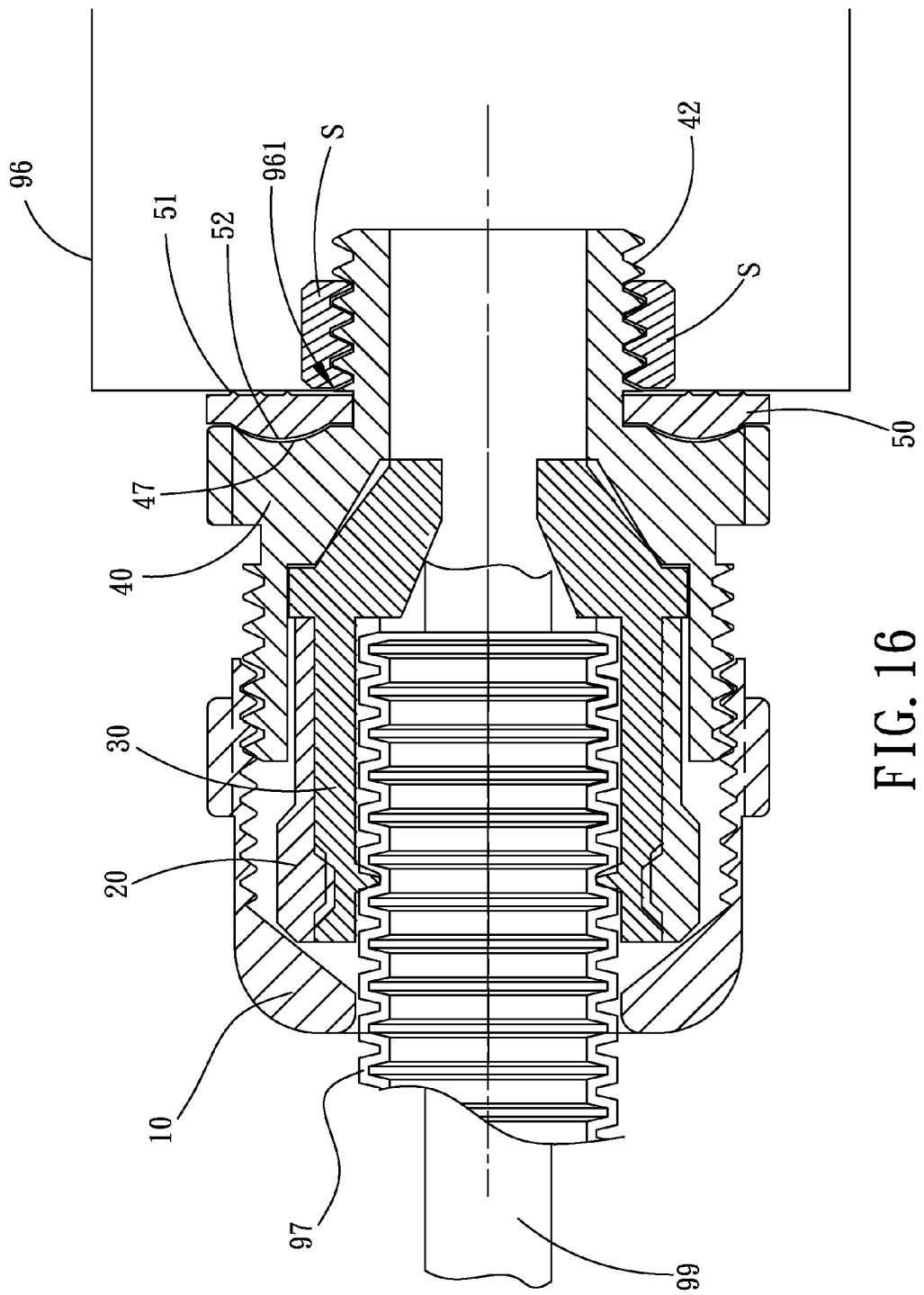
FIG. 16 is a schematic sectional view of the present invention, showing the double-lock cable and flexible conduit gland of FIG. 14 used with a cable and a flexible conduit.

FIGS. 14~16 illustrate a double-lock cable and flexible conduit gland 300 in accordance with a third embodiment of the present invention. According to this second embodiment, the double-lock cable and flexible conduit gland 300 comprises a shell 10, a collar 20, a packing ring 30, a connection ring 40 and a gasket ring 50. This third embodiment is substantially similar to the aforesaid first embodiment with the exception that the gasket ring 50 of this third embodiment has a convex portion 52 protruded from one side thereof for stopping against the stop flange segment 45 of the connection ring 40, and a plurality of raised portions 51 protruded from the other side thereof for stopping against a panel or box member 96 upon fixation of the second connection ring segment 44 to the panel or box member 96; the stop flange segment 45 of the connection ring 40 of this third embodiment has a recessed portion 47 configured to match the convex portion 52 of the gasket ring 50. After insertion of the outer thread 46 of the second connection ring segment 44 of the connection ring 40 into a hole 961 on the box member 96, a lock nut S is threaded onto the outer thread 46 to lock the connection ring 40 to the box member 96. At this time, the raised portions 51 of the gasket ring 50 are deformed and stopped against the box member 96 to seal the gap, protecting against moisture and dust particles.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A double-lock cable and flexible conduit gland for securing a cable, or, a cable and flexible conduit, to a box member, comprising:
   a shell, said shell having an axial through hole surrounded by an inside wall thereof, a tapered inner surface formed on the inside wall of said shell and an inner thread formed on the inside wall of said shell;

a collar inserted in said shell, said collar having an axial through hole, a beveled outer end edge suspending outside the axial through hole of said collar and stoppable against the tapered inner surface of said shell and a plurality of protruding inner stop portions suspending inside the axial through hole of said collar;

a packing ring inserted through the axial through hole of said collar and compressible by said collar to hold down the cable or the cable and flexible conduit, said packing ring having a first packing ring segment, a second packing ring segment and a stop flange segment connected between said first packing ring segment and said second packing ring segment and an axial through hole surrounded by said first packing ring segment and said second packing ring segment for the insertion of the cable, or the cable and flexible conduit, said second packing ring segment defining a tapered outer surface, said first packing ring segment having an outside annular groove extending around the periphery thereof for receiving the protruding inner stop portions of said collar, wherein the axial through hole of said packing ring has a diameter at said first packing ring segment larger than that at said second packing ring segment;

a connection ring sleeved onto said collar and said packing ring and connectable between said shell and the box member, said connection ring having a retaining surface and a tapered inner surface formed on an inside wall thereof and stopped against said stop flange segment of said packing ring and the tapered outer surface of said packing ring, respectively, and a first outer thread extending around the periphery thereof and threaded into the inner thread of said shell.

2. The double-lock cable and flexible conduit gland as claimed in claim 1, wherein said second packing ring segment of said packing ring reduces gradually in diameter from said first packing ring segment toward the free end thereof.

3. The double-lock cable and flexible conduit gland as claimed in claim 1, wherein said collar comprises a plurality of pawls spaced around the axial through hole thereof; said beveled outer end edge of said collar is formed on an outer end of each of said pawls; each of said protruding inner stop portions of said collar is formed on an inner side of each of said pawls.

4. The double-lock cable and flexible conduit gland as claimed in claim 1, wherein said packing ring is prepared from an elastically deformable material.

5. The double-lock cable and flexible conduit gland as claimed in claim 1, wherein said connecting ring defines a first connection ring segment, a second connection ring segment and a stop flange segment connected between said first connection ring segment and said second connection ring segment, said stop flange segment having an outer diameter greater than said first connection ring segment and said second connection ring segment, said first connection ring segment carrying said first outer thread of said connection ring on the periphery thereof; said connection ring further comprises a second outer thread extending around the periphery of said second connection ring segment for fastening to a hole on said box member.

6. The double-lock cable and flexible conduit gland as claimed in claim 5, further comprising a gasket ring mounted on said second connection ring segment of said connection ring and stopped at one side of said stop flange segment.

7. The double-lock cable and flexible conduit gland as claimed in claim 6, wherein said gasket ring has a plurality of raised portions protruded from one side thereof for stopping against said stop flange segment of said connection ring, and a convex portion protruded from an opposite side thereof for stopping against said box member upon fixation of said second connection ring segment to said box member.

8. The double-lock cable and flexible conduit gland as claimed in claim 6, wherein said gasket ring has a plurality of raised portions protruded from one side thereof for stopping against said box member upon fixation of said second connection ring segment to said box member, and a convex portion protruded from an opposite said thereof and stopped against said stop flange segment of said connection ring; said stop flange segment of said connection ring has a recessed portion matching the convex portion of sad gasket ring.

9. The double-lock cable and flexible conduit gland as claimed in claim 1, wherein said packing ring has at least one dent located on the periphery of said second packing ring segment.

10. The double-lock cable and flexible conduit gland as claimed in claim 1, wherein said packing ring has a hooked portion inwardly protruded from and extending along an inside wall thereof for engaging into a groove the inserted flexible conduit.

* * * * *